Figure 1:
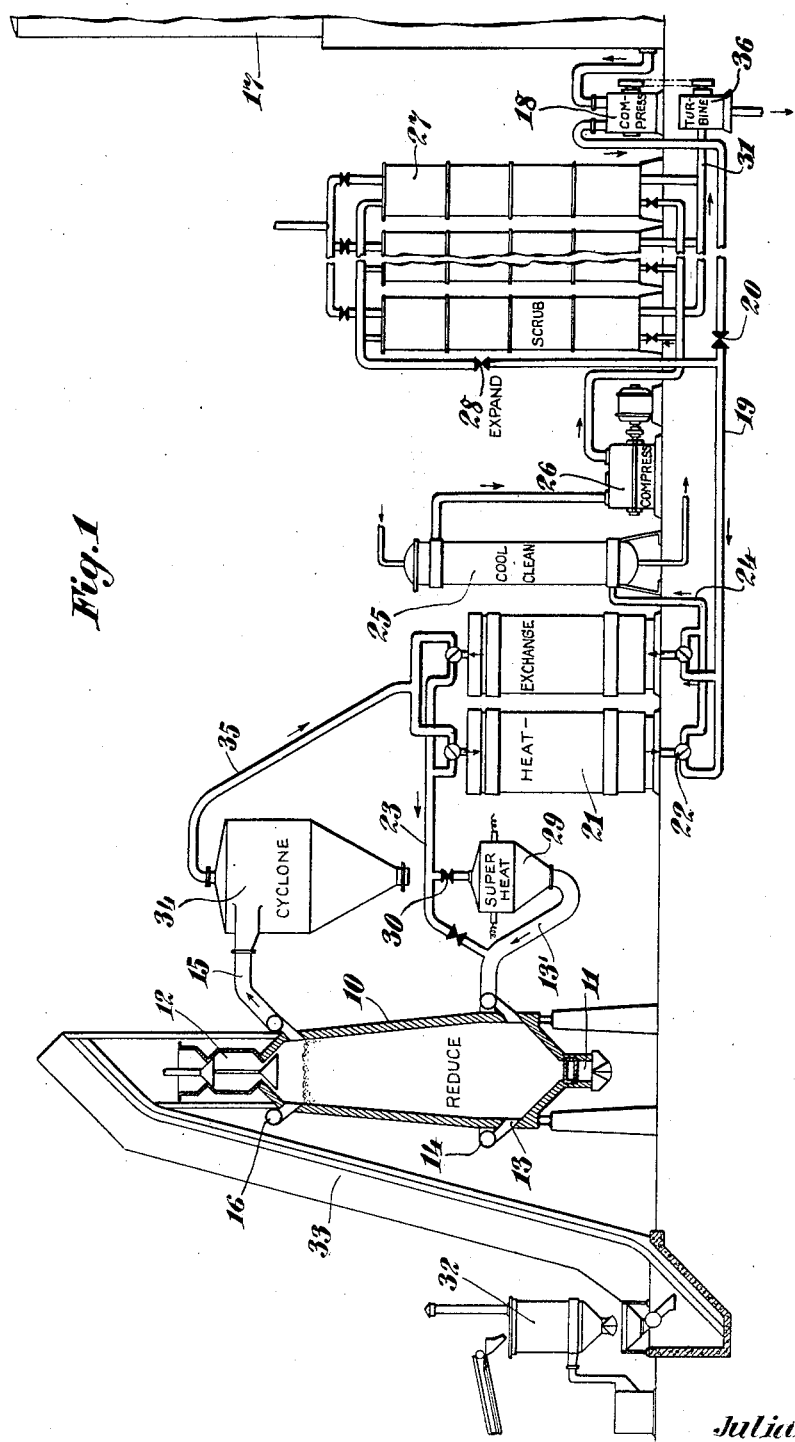

Jan. 3, 1939.　　　　J. M. AVERY　　　　2,142,100
PRODUCTION OF SPONGE IRON
Filed June 12, 1936　　　2 Sheets-Sheet 1

INVENTOR.
Julian M. Avery,
BY Hocquet, Neary & Campbell,
HIS ATTORNEYS

Patented Jan. 3, 1939

2,142,100

UNITED STATES PATENT OFFICE 2,142,100

PRODUCTION OF SPONGE IRON

Julian M. Avery, Greenwich, Conn., assignor to Arthur D. Little, Inc., Cambridge, Mass., a corporation of Massachusetts Application June 12, 1936, Serial No. 84,796

9 Claims. (Cl. 75—35)

This invention relates to an improved process for the reduction of iron ore in the solid state to the metallic iron which is generally known as sponge iron.

Numerous processes have been proposed heretofore for the manufacture of sponge iron on a commercial scale and those that have given the greatest promise of success are those in which the iron ore is reduced by hot gases containing carbon monoxide, hydrogen, or the like, or mixtures thereof, while maintaining the temperature of the reaction by means of the sensible heat of such gases, which are accordingly preheated to the required temperature. However, one of the greatest impediments to the commercial development of such a process is the fact that at the relatively low temperatures necessarily used in the production of sponge iron, the reaction velocities are small. Also, the equlibrium conditions are such that in most cases it is impossible to utilize more than about 20% of the reducing power of the gas if reasonable reaction rates are to be maintained. Consequently, the reduction of any considerable quantity of ore requires a very large volume of gas passed through it at a relatively low velocity, with the result that the equipment required for production of sponge iron on a commercial scale is cumbersome and expensive. This condition is aggravated if the reduction is carried out in a rotary kiln or by means of dilute gases, such as reformed natural gas, producer gas or the like.

Another objection to the commercial production of sponge iron according to processes employed heretofore, is that the reducing gases are relatively costly and, if they are to be used to greatest economic advantage, they must be recirculated in a closed cycle. In reducing the iron ore, a portion of the reducing gas is oxidized and, in order to maintain the reducing power of the gas, it is necessary to keep the proportion of these oxidized products in the circulating gases to a low limit. The most common method adopted heretofore for accomplishing these purposes is to circulate the gases in a closed system, wherein carbon monoxide and hydrogen are regenerated by passing all or a part of the partially oxidized gases through a bed of high temperature carbon, such as a bed of electrically-heated coke. Another method of enriching or recarburizing the gases is to treat them in a flaming arc with oil. In this way the gases are simultaneously recarburized and heated to the desired temperature. With both of these methods of recarburization, an excess of CO and $H_2$ are produced over that required for reducing purposes, since each volume of $CO_2$ or $H_2O$ produces at least two volumes of reducing gas, requiring that the system be constantly bled of a quantity of reducing gas equal to or greater than that required to reduce the iron ore. Since the bled gas can only be used for fuel purposes, a considerable economic waste results.

In accordance with the present invention a process is provided for reducing iron ore in the solid state to metallic iron by passing through or in contact with the mass of ore particles or lumps, a current of hot reducing gases in a substantially closed cycle wherein the gases are preferably maintained continuously at a substantial super-atmospheric pressure, the reducing power of the gases being continuously maintained by removing from the discharged gases those oxidation products resulting from the reduction of the ore and returning the un-oxidized remainder of the gases for reducing purposes, adding as much make-up gas from outside the cycle as is necessary to maintain the predetermined volume, whereby no excess of reducing gas is produced in the system and the major proportion of the oxidation products are recoverable as useful products.

More particularly, the invention comprises the process of maintaining a sealed furnace or rotary kiln charged with lump iron ore under a pressure of between about two and about seven atmospheres absolute by circulating at that pressure through the reducer, and the closed system including it, a mixture of reducing gases such as hydrogen and carbon monoxide, the resulting partially oxidized gases being scrubbed to remove the oxidized gases, superheated in an electric arc or the like and returned to the reducer for reuse, additional make-up gases being added as described. The scrubbing liquor condenses the water vapor and dissolves the carbon dioxide which may be recovered in relatively pure state as a by-product. The ore is preferably preheated to prevent temperature decrease in the closed cycle and recomposition of carbon monoxide which may result from the introduction of cold ore into the reducer.

It will be seen that with the present process, high quality sponge iron may be produced economically on a large scale with equipment not disproportionately large or expensive and with a minimum of waste.

Figure 2:
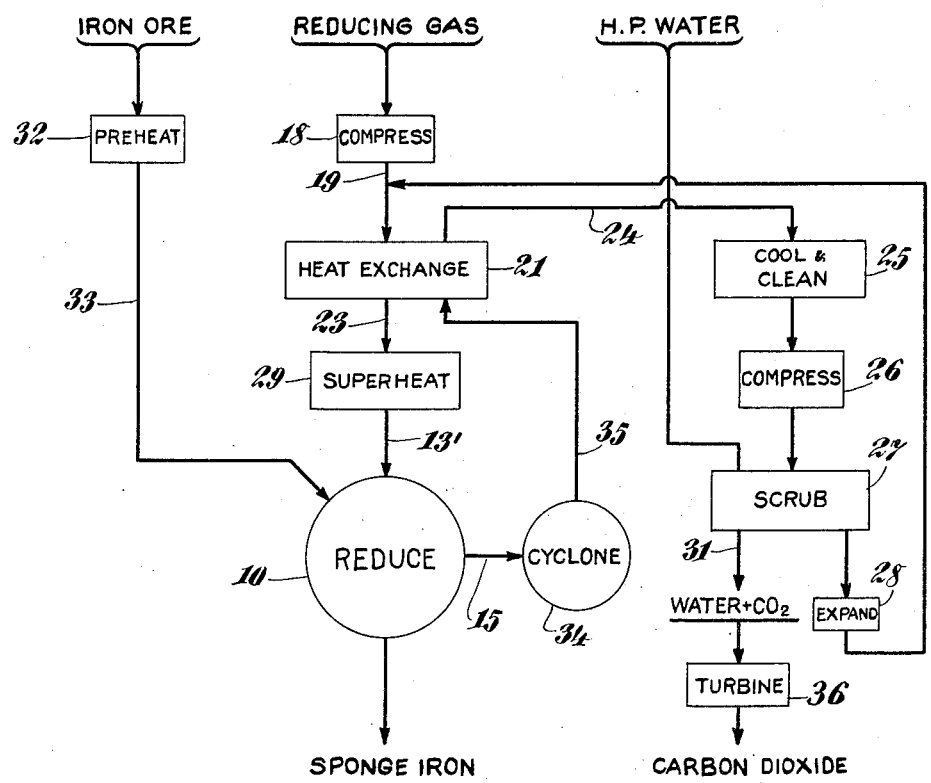

For a more complete understanding of the invention, reference may be had to the accompanying drawings, in which:

Figure 1 is a schematic diagram of the preferred equipment for carrying out the process of this invention; and Fig. 2 is a flow diagram of the process.

Referring to Fig. 1 of the drawings, numeral 10 designates a shaft furnace, of blast furnace shaft or other smelting or reducing furnace design, provided with a pressure lock 11 at its lower or discharge end, and a double bell and hopper combination 12 at its upper end, which also serves as a pressure lock, whereby the pressure within the reducer 10 may be maintained at a predetermined degree. The reducer 10 is provided with the usual tuyères 13 supplied from the tuyère header or ring 14, and the down-take pipe 15 is connected to the outlet header or ring 16 at the upper end of the reducer 10.

The make-up gas for reducing purposes may be stored in a gas holder 17 and may be water gas, natural gas, coke oven gas, blast or electric furnace gas, producer gas, or any other gas containing predominantly carbon monoxide or hydrogen, or both. A mixture of about 50% hydrogen and about 50% carbon monoxide is preferred. The make-up gas is employed for starting and maintaining the reducing gas at proper volume, and is introduced through a compressor 18 into the closed cycle by way of duct 19 and check-valve 20. The compressor 18 compresses the gas to a pressure slightly higher than that desired for the gas within the closed cycle, such as for example six atmospheres where five atmospheres absolute is selected as the operating pressure, the increased pressure compensating for friction losses in the system.

Duct 19 leads through suitable heat exchangers 21 which are alternately placed into operation by manipulating valves 22 in accordance with well-known practice. From there the reducing gas is conveyed by duct 23 and blast feed pipe 13' into the reducer 10 through which it passes upwardly in a direction counter-current to the downward movement of the iron ore, which is charged through the bell and hopper 12 into the reducer 10 in lump form.

The reducing gas reacts with the iron ore within the reducer in the well-known manner to produce sponge iron in the solid state without melting, the sponge iron being withdrawn through the pressure lock 11. With the assumed pressure within the reducer 10 approximately five atmospheres absolute, intimate coaction between the reducing gases and the ore is accelerated.

The waste gas containing oxidation products, such as carbon dioxide and water vapor, resulting from the reduction of the iron ore, leaves the reducer 10 at high temperature and under the aforementioned pressure by way of down-take pipe 15. It is freed of dust in the cyclone or other dust catcher 34 and is led by duct 35 to the heat exchangers 21 where the waste gas gives up its heat to heating the reducing gas by-passed through the heat exchangers 21 from the duct 19, the operation of the heat exchangers being in accordance with standard practice. Heat exchangers 21 of the regenerative type may be replaced by a recuperative type of exchanger, if desired. From the heat exchangers 21 the gas passes out through duct 24 through a cooler 25 which removes the residual heat and dust and from there preferably through a compressor 26 which pumps it at elevated pressures, say 15 atmospheres absolute, through suitable scrubbers 27 where the $CO_2$ and $H_2O$ are removed.

The pressure of the regenerated gas is again decreased to six atmospheres absolute by reducing valve 28 or by passing it through a compressed gas engine to utilize its energy of compression, and reintroduced into the reducing gas supply line 19, thus forming a closed cycle, which, after starting, is self-sustaining and self-supplying with reducing gas in the manner described except for the addition of such make-up gas from holder 17 as is necessary to maintain the proper gas volume. The compressor 18 is employed to boost make-up gas pressure to be equal to that of the gas circulating in the closed system, which is approximately six atmospheres where the pressure within the reducer 10 is desired to be approximately five atmospheres, for example.

Although additional pressure is preferable for scrubbing, it is not obligatory, so that compressor 26 is not essential. Where additional pressure is employed, however, a decompressor, such as a turbine, may be substituted for the expansion valve 28 so that the excess energy of compression may be utilized for supplying part of the power for operating the compressor 26.

Preferably, the reducing gas is superheated in a suitable superheater, which may be an electric furnace 29 of the flaming arc type, through which all or a part of the reducing gas supply is passed from duct 23 through valve 30 to blast feed pipe 13'.

The waste liquor discharged into pipe 31 from the scrubbers 27 will usually contain a large quantity of $CO_2$, which may be recovered as a valuable by-product. The scrubbing liquor may be water or may be an alkaline solution such as an amine, depending upon requirements. Where water is used, the compressor 26 and reducing valve 28 are preferred, inasmuch as the size of the scrubbers 27 can be very materially reduced if the gas is under relatively high pressure, inasmuch as $CO_2$ is then absorbed at a much greater rate, viz. for 20% $CO_2$, fifteen atmospheres is desirable.

To avoid deposition of free carbon in the ore by decomposition of carbon monoxide at low temperatures, and to conserve heat in the closed gaseous cycle, the ore is preferably preheated in a suitable preheater 32 to a temperature of at least about 600° C. before charging into the reducer 10 by means of the usual skip hoist 33, or the like.

The operation of the system is readily understood from the foregoing description and from the flow diagram of Fig. 2, in which the units of the system are identified as in Fig. 1. It should be emphasized that the process comprises a closed cycle system, the various elements of which cooperate to employ the reducing gases with maximum efficiency and to minimize the amount of heat and mechanical energy which must be used by the system to cause it to function, and wherein all steps are adapted to the simplest possible mechanical operations, thus enabling practically complete automatic control. A distinguishing feature of the process is that it is adapted to the maintenance of super-atmospheric pressure throughout the closed gaseous cycle. Another distinguishing feature is the absence of a recarburizing step within the closed cycle.

The maximum pressure that can be employed in cases where carbon monoxide comprises a considerable proportion of the reducing gases, is limited by the equilibrium conditions of the reaction (1) $2CO = CO_2 + C$, which is driven strongly from left to right by increase in pressure and by low temperatures. The pressure is also limited by the equilibrium conditions of the reaction (2) $FeO+CO=Fe+CO_2$, which is not affected by pressure, but which gives equilibrium values of $CO_2$ which may be lower than those of reaction (1), unless temperature and pressure are properly controlled.

It has been found, for example, that if the feed gas is preheated to a temperature of at least 900° C., a pressure of approximately five atmospheres absolute may be used without difficulty, but at fifteen atmospheres pressure and a temperature of approximately 900° C., the equilibrium mixture of CO and $CO_2$ will oxidize metallic iron. Accordingly, in order to maintain a sufficient margin of reactivity of the reducing gas, it is essential that the pressure be not too high. Likewise, if a carbon-free product is desired, temperature and pressure must be carefully controlled. Thus, the pressure and temperature combination under favorable conditions is less than fifteen atmospheres, and at least two atmospheres absolute, at a temperature of at least 900° C. A pressure between two and seven atmospheres absolute, or an average of approximately five atmospheres absolute, for example, permits high efficiency in the use of the reducing gas, avoids deposition of carbon, and is not so high as to introduce undue hazards or mechanical difficulties.

The use of pressure in a closed gaseous cycle has another important advantage. The heat balance in a sponge iron process is delicate, and, for reasons of economy, heat must be conserved. When pressure is employed as described, the surface of all parts of the closed system is naturally decreased, with the result that the heat balance is readily controlled and heat is conserved. This is especially important in connection with the furnace itself for if heat losses at that point are excessive, it will be necessary to preheat the reducing gases to a temperature which may cause sticking and agglomeration of the sponge iron in the bottom of the furnace.

As for temperatures, under ordinary operating conditions, an initial temperature of the reducing gases of approximately 1000° C. to 1100° C. is necessary to reduce the iron ore if it is in lump size. With fines, a temperature of 800° C. to 900° C., and, under favorable conditions, as low as 700° C., will be sufficient, the temperature depending largely on the composition of the reducing gas, viz. with greater proportions of hydrogen in the gas, the reaction temperatures may be relatively lower. The reduction temperature range, therefore, is approximately 700° C. to 1100° C.

The arrangement of equipment illustrated in Fig. 1 is preferred for economy and facility of operation and has been designed to take advantage of local conditions of fuel, water supply, and electric power availability. Thus, the flaming arc preheater 29 is preferred where inexpensive hydro-electric power is available and, as indicated in Fig. 2, where high-pressure water is available for the scrubbers 27, the discharge therefrom may be utilized to operate a Pelton wheel turbine 36, or the like, for driving the compressor 18 or for other purposes, such as a water pump for supplying scrubbing liquor, or the compressor 26, or on electric generator.

Although the process of this invention has been illustrated and described as carried on in a reducer of the shaft furnace type with lump ores, it is to be understood that it is equally applicable to suitably sealed rotary kilns charged with fine ore, the gases travelling upwardly through the inclosed kiln countercurrently to the ore. The invention is also susceptible of changes within the scope of the appended claims.

I claim:

1. A process for producing sponge iron comprising supplying iron ore to a reduction zone, exposing said ore within said zone to the action of a reducing gas and reducing said ore at least in part to metallic iron and oxidizing a part of said gas, conducting said partially oxidized gas from said reducing zone, extracting heat from said gas, removing the products of the reducing reaction from said cooled gas to purify the same, reheating said purified gas with the heat previously extracted from said gas, superheating said reheated gas to a temperature of between about 700° to 1100° C., and passing said superheated purified gas to the said reduction zone.

2. A continuous process for producing sponge iron comprising supplying iron ore to a reduction zone, exposing said ore within said zone to the action of a reducing gas and reducing said ore at least in part to metallic iron and oxidizing a part of said gas, conducting said partially oxidized gas from said reducing zone, extracting heat from said gas, removing the products of the reducing reaction from said cooled gas to purify the same, reheating said purified gas with the heat previously extracted from said gas, superheating said reheated gas to a temperature of between about 700° C. to 1100° C., and passing said superheated purified gas to the said reduction zone, and adding make-up gas to said reducing gases from an external source.

3. A process for producing sponge iron, comprising supplying iron ore to a reduction zone, exposing said ore in said zone to the action of a reducing gas at a pressure in excess of about two atmospheres absolute to reduce the ore at least partially to metallic iron and oxidizing part of the gas, conducting the gas continuously from said reducing zone, extracting heat from said gas, removing the oxidized part of the gas, reheating said gas to a temperature between 700° C. and 1100° C. and returning said superheated gas to said reduction zone.

4. A process for producing sponge iron, comprising supplying iron ore to a reduction zone, exposing said ore in said zone to the action of a reducing gas at a super-atmospheric pressure of at least about two atmospheres absolute and a temperature of between about 700° C. and 1100° C. to reduce the ore at least partially to metallic iron and to oxidize part of the gas, maintaining the pressure of the reducing and oxidized gas at a pressure less than that at which the oxidized gases tend to reoxidize the iron, conducting the gas continuously from said reducing zone, extracting heat from said gas, removing the oxidized part of the gas, adding make-up gas to the reducing gas, reheating said gas to the reducing temperature and returning said superheated gas to said reduction zone.

5. A process for producing sponge iron, comprising supplying iron ore to a reduction zone, exposing said ore in said zone to the action of heated reducing gas at a pressure in excess of two and not substantially greater than seven atmospheres absolute and at a temperature between about 700° C. and 1100° C. to reduce at least partially the iron ore to sponge iron and oxidize a portion of the reducing gas, withdrawing said gases continuously from said reducing zone, scrubbing said gases to remove the oxidized portion, reheating said reducing gas to between about 700° C. and 1100° C. and returning it to the reducing zone.

6. A process for producing sponge iron, comprising supplying iron ore to a reduction zone, exposing said ore in said zone to the action of heated reducing gas at between about two and seven atmospheres absolute and at a reducing temperature below the fusion temperature of iron to reduce at least partially the iron ore to sponge iron and oxidize a portion of the reducing gas, withdrawing said gases continuously from said reducing zone, scrubbing said gases to remove the oxidized portion, adding make-up reducing gas to said reducing gas from an external source, reheating said reducing gas to the reducing temperature and returning it to the reducing zone.

7. A process for producing sponge iron, comprising supplying iron ore to a reduction zone and exposing said iron ore in said zone to the reducing action of a recirculated reducing gas at a pressure of about two atmospheres absolute and above and at a reducing temperature less than the melting point of iron to reduce the iron ore to sponge iron.

8. A process for producing sponge iron comprising supplying iron ore to a reduction zone and exposing said iron ore in said reduction zone to the action of a recirculated reducing gas at a super-atmospheric pressure of between about two and seven atmospheres absolute and at a temperature less than the fusion temperature of iron.

9. A process for producing sponge iron comprising supplying iron ore to a reduction zone, exposing said ore within said zone to the action of a heated reducing gas and reducing said ore at least in part to metallic iron and oxidizing a part of said gas, conducting said partially oxidized gas from said reducing zone, extracting heat from said gas, removing the products of the reducing reaction from said cooled gas to purify the same, reheating said purified gas with the heat previously extracted from said gas, superheating said reheated gas to a temperature below the melting point of iron and passing said super-heated purified gas to the said reduction zone.

JULIAN M. AVERY.